US012766571B2

(12) United States Patent
Zhao

(10) Patent No.: US 12,766,571 B2
(45) Date of Patent: Oct. 20, 2026

(54) ACOUSTIC DRAINAGE STRUCTURE AND ELECTRONIC DEVICE

(71) Applicant: GOERTEK INC., Weifang (CN)

(72) Inventor: Jiangtao Zhao, Weifang (CN)

(73) Assignee: GOERTEK INC., Weifang (CN)

( * ) Notice: Subject to any disclaimer, the term of this patent is extended or adjusted under 35 U.S.C. 154(b) by 182 days.

(21) Appl. No.: 18/598,264

(22) Filed: Mar. 7, 2024

(65) Prior Publication Data

US 2024/0207907 A1 Jun. 27, 2024

Related U.S. Application Data

(63) Continuation of application No. PCT/CN2021/138147, filed on Dec. 15, 2021.

(30) Foreign Application Priority Data

Oct. 22, 2021 (CN) ......................... 202111237652.3

(51) Int. Cl.
*B08B 7/02* (2006.01)
*G10K 11/178* (2006.01)
(Continued)

(52) U.S. Cl.
CPC .......... *B08B 7/026* (2013.01); *G10K 11/1781* (2018.01); *H04R 1/086* (2013.01); *H04R 1/44* (2013.01)

(58) Field of Classification Search
None
See application file for complete search history.

(56) References Cited

U.S. PATENT DOCUMENTS 2,755,343 A * 7/1956 Levy ........................ H04R 1/44 381/189
6,693,849 B1 * 2/2004 Eberl ..................... H04R 17/02 367/160

(Continued)

FOREIGN PATENT DOCUMENTS

CN 204993740 U 1/2016
CN 105323674 A 2/2016

(Continued)

OTHER PUBLICATIONS

First Office Action in Corresponding Chinese Application No. 202111237652.3, dated Apr. 2, 2022; 16 pgs.

(Continued)

*Primary Examiner* — Jonathan D Armstrong
(74) *Attorney, Agent, or Firm* — HAUPTMAN HAM, LLP

(57) ABSTRACT

Disclosed is an acoustic drainage structure and an electronic device. The acoustic drainage structure includes a housing and an acoustic assembly. The housing is provided with an accommodating cavity and a first sound-pickup hole communicated with the accommodating cavity. The acoustic assembly includes a sound-pickup module provided in the accommodating cavity and a sound-generating unit provided in the accommodating cavity. The sound-pickup module includes a sound-pickup unit, a connector and a breathable waterproof membrane, the breathable waterproof membrane is provided at a cavity wall of the accommodating cavity, the connector is connected to the breathable waterproof membrane and the sound-pickup unit, and the connector is provided with a second sound-pickup hole. The breathable waterproof membrane covers the first sound-pickup hole and the second sound-pickup hole, and the breathable waterproof membrane, and a hole wall of the second sound- (Continued)

pickup hole and the sound-pickup unit are enclosed to form a sound-pickup cavity.

9 Claims, 7 Drawing Sheets

(51) Int. Cl.
*H04R 1/08* (2006.01)
*H04R 1/44* (2006.01)

(56) References Cited

U.S. PATENT DOCUMENTS

| | | | | |
|---|---|---|---|---|
| 9,408,009 | B1 * | 8/2016 | Witte | H04R 31/00 |
| 10,657,950 | B2 * | 5/2020 | Hua | H04R 1/1083 |
| 10,674,243 | B2 * | 6/2020 | Kargus, IV | H04R 1/04 |
| 2006/0140432 | A1 * | 6/2006 | Ueki | H04R 1/086 381/369 |
| 2006/0177089 | A1 * | 8/2006 | Greco | H04R 1/023 381/391 |
| 2011/0059719 | A1 * | 3/2011 | Spielvogel | H04M 1/72424 455/404.1 |
| 2013/0285809 | A1 * | 10/2013 | Sekiyama | G08B 21/20 340/540 |
| 2014/0161293 | A1 * | 6/2014 | Wang | H04R 1/021 381/332 |
| 2016/0234594 | A1 * | 8/2016 | Ogura | B60R 11/0247 |
| 2017/0111720 | A1 * | 4/2017 | Miehl | H04R 1/086 |
| 2017/0164084 | A1 | 6/2017 | Mtt et al. | |
| 2018/0084324 | A1 | 3/2018 | Mtt et al. | |
| 2020/0020313 | A1 * | 1/2020 | Hua | H04R 1/1016 |
| 2020/0080775 | A1 | 3/2020 | Argyres et al. | |
| 2020/0359145 | A1 | 11/2020 | Kim et al. | |
| 2021/0168531 | A1 * | 6/2021 | Qi | G10K 11/26 |
| 2021/0250672 | A1 | 8/2021 | Han et al. | |

FOREIGN PATENT DOCUMENTS

| | | | |
|---|---|---|---|
| CN | 108600924 | A | 9/2018 |
| CN | 108683965 | A | 10/2018 |
| CN | 207968911 | U | 10/2018 |
| CN | 109104652 | A | 12/2018 |
| CN | 208522976 | U | 2/2019 |
| CN | 109698989 | A | 4/2019 |
| CN | 110366081 | A | 10/2019 |
| CN | 111034214 | A | 4/2020 |
| CN | 213990999 | U | 8/2021 |
| JP | 2006186422 | A | 7/2006 |
| JP | 2008167130 | A | 7/2008 |

OTHER PUBLICATIONS

Grant Notification in Corresponding Chinese Application No. 202111237652.3, dated Jun. 22, 2022; 5 pgs.
International Search Report and Written Opinion in Corresponding International Application No. PCT/CN2021/138147, mailed Jul. 8, 2022; 13 pgs.

* cited by examiner

ACOUSTIC DRAINAGE STRUCTURE AND ELECTRONIC DEVICE

CROSS-REFERENCE TO RELATED APPLICATIONS

This application is a continuation application of International Application No. PCT/CN2021/138147, filed on Dec. 15, 2021, which claims priority to Chinese Patent Application No. 202111237652.3, filed on Oct. 22, 2021. The disclosures of the above-mentioned applications are incorporated herein by reference in their entireties.

TECHNICAL FIELD

The present application relates to the field of acoustic technology, and in particular to an acoustic waterproof structure and an electronic device.

BACKGROUND

Currently, many smart wearable products have acoustic functions, such as smart watches, smart bracelets, etc. Smart wearable products generally have built-in microphones, which are configured to collect user voices to implement corresponding voice interaction functions.

In related art, the microphone's sound-pickup end is covered with a waterproof membrane. The waterproof membrane is located between the sound-pickup hole of the product housing and the sound-pickup end of the microphone to provide waterproof protection for the microphone. When smart wearable products are used in scenarios such as rainfall, swimming or showering, water will adhere to the surface of the waterproof membrane via the sound pickup hole. The accumulated water on the waterproof membrane will limit the vibration of the waterproof membrane, thus hindering the sound conduction of the waterproof membrane, causing the microphone to have low loudness and noise when collecting external sounds. Even if part of the water is thrown out by shaking the product, there will still be moisture remaining on the waterproof membrane, which will still affect the sound-pickup quality of the microphone.

SUMMARY

The main purpose of the present application is to propose an acoustic drainage structure, aiming to realize the drainage of the sound-pickup module.

In order to achieve the above purpose, the present application proposes an acoustic drainage structure, which includes:

a housing provided with an accommodating cavity and a first sound-pickup hole communicated with the accommodating cavity; and an acoustic assembly including a sound-pickup module provided in the accommodating cavity and a sound-generating unit provided in the accommodating cavity, wherein the sound-pickup module includes a sound-pickup unit, a connector and a breathable waterproof membrane, and the breathable waterproof membrane is provided at a cavity wall of the accommodating cavity; the connector is connected to the breathable waterproof membrane and the sound-pickup unit, and the connector is provided with a second sound-pickup hole; the breathable waterproof membrane is configured to cover the first sound-pickup hole and the second sound-pickup hole, and the breathable waterproof membrane, a hole wall of the second sound-pickup hole and the sound-pickup unit are enclosed to form a sound-pickup cavity; and the connector is provided with an air guiding passage communicated with the sound-pickup cavity and the accommodating cavity, so as to make the sound-generating unit drive the breathable waterproof membrane to vibrate.

In an embodiment according to the present application, the air guiding passage is configured to penetrate an outer wall of the connector and the hole wall of the second sound-pickup hole.

In an embodiment according to the present application, the air guiding passage includes at least two air guiding branches provided at the connector, and at least two of the air guiding branches are communicated with the sound-pickup cavity and the accommodating cavity.

In an embodiment according to the present application, each air guiding branch is provided at intervals, and each air guiding branch is communicated with the sound-pickup cavity and the accommodating cavity.

In an embodiment according to the present application, at least two air guiding branches are communicated with each other; and/or the air guiding passage further includes at least one communication branch, and each communication branch is communicated with two air guiding branches.

In an embodiment according to the present application, the air guiding passage includes two air guiding branches provided at the connector; and the two air guiding branches are symmetrically provided at two opposite sides of the second sound-pickup hole, and each air guiding branch is communicated with the sound-pickup cavity and the accommodating cavity.

In an embodiment according to the present application, the air guiding passage includes a plurality of air guiding branches provided at the connector; and the plurality of the air guiding branches are provided around the second sound-pickup hole, and each air guiding branch is communicated with the sound-pickup cavity and the accommodating cavity.

In an embodiment according to the present application, the connector includes an adhesive layer and a supporting layer;

the adhesive layer is configured to adhere the supporting layer and the breathable waterproof membrane, and the sound-pickup unit is provided at a side of the supporting layer away from the adhesive layer; the adhesive layer is provided with a first through hole, and the supporting layer is provided with a second through hole; and the first through hole is communicated with the second through hole to form the second sound-pickup hole; and the air guiding passage is provided at the adhesive layer and/or the supporting layer.

In an embodiment according to the present application, the housing is further provided with a sound-generating hole communicated with the accommodating cavity, and the sound-generating unit is provided corresponding to the sound-generating hole; and a sound leaking hole is provided at one end of the sound-generating unit away from the sound-generating hole, and the sound leaking hole is communicated with the accommodating cavity.

In an embodiment according to the present application, the acoustic drainage structure has a drainage state when the breathable waterproof membrane vibrates; and in the drainage state, a sound generating frequency of the sound-generating unit is greater than or equal to 30 HZ and less than or equal to 100 HZ.

In addition, the present application further proposes an electronic device including the above-mentioned acoustic drainage structure.

In an embodiment according to the present application, the electronic device further includes:

a filter module electrically connected to the sound-pickup unit of the acoustic drainage structure and configured to reduce noise collected by the sound-pickup unit; and a communication module electrically connected to the filter module and configured to process audio signals.

The technical solution according to the present application is to provide a second sound-pickup hole and an air guiding passage on the connector that connects the sound-pickup unit and the waterproof membrane, so that the air guiding passage is communicated with the accommodating cavity of the housing and the sound-pickup cavity enclosed by the breathable waterproof membrane, the hole wall of the second sound-pickup hole and the sound-pickup unit. The sound wave generated by the sound-generating unit during working are configured to drive the air in the accommodating cavity and air guiding passage to vibrate, thereby driving the air in the sound-pickup cavity to drive the breathable waterproof membrane to vibrate, so that the breathable waterproof membrane can shake off the moisture attached to the surface of the breathable waterproof membrane. The shaken moisture can also be discharged outward via the first sound-pickup hole, which can effectively solve the problem of water accumulation on the breathable waterproof membrane, realize the drainage of the sound-pickup module, and improve the sound-pickup quality of the sound-pickup unit.

BRIEF DESCRIPTION OF THE DRAWINGS

In order to explain the embodiments of the present application or the technical solutions in the existing technology more clearly, the accompanying drawings needed to be used in the description of the embodiments or the existing technology will be briefly introduced below. Obviously, the accompanying drawings in the following description are only some embodiments of the present application, other accompanying drawings can be obtained based on the provided accompanying drawings without exerting creative efforts for those of ordinary skill in the art.

DETAILED DESCRIPTION OF THE EMBODIMENTS

Figure 1:
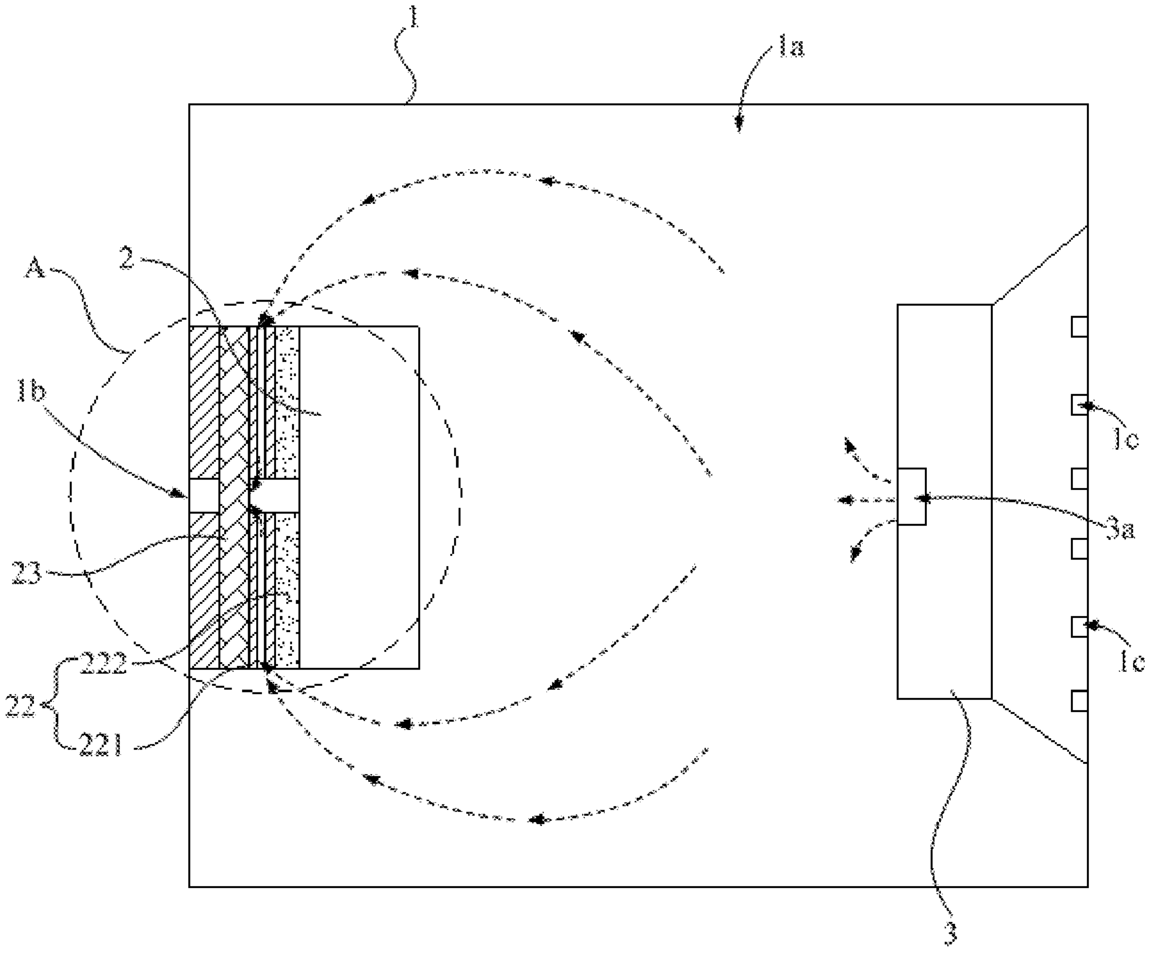
FIG. 1 is a structural schematic view of an acoustic drainage structure according to the present application.

The technical solutions in the embodiments according to the present application will be clearly and completely described below in conjunction with the accompanying drawings in the embodiments according to the present application, and it is clear that the described embodiments are only a part of the embodiments according to the present application, and not all of the embodiments. Based on the embodiments in the present application, all other embodiments obtained by those of ordinary skill in the art without making creative labor fall within the scope of the present application.

It should be noted that in the embodiment of the present application, all directional indications (such as up, down, left, right, front, back or the like) are only used to explain the relative positional relationship, movement and so on between various components in a specific posture (as shown in the accompanying drawings). If the specific posture changes, the directional indication will also change accordingly.

In the present application, unless otherwise clearly stated and limited, the terms “connection”, “fixed” and so on should be understood in a broad sense. For example, “connection” can be a fixed connection, a detachable connection or an integral body; it can be a mechanical connection or an electrical connection; it can be a direct connection or an indirect connection through an intermediate medium; it can be an internal connection between two components or the interaction between two components, unless otherwise clearly stated and limited. For those of ordinary skill in the art, the specific meanings of the above terms in the present application can be understood according to the specific circumstances.

In addition, if there are descriptions involving “first”, “second” or the like, the descriptions of “first”, “second” or the like are only for descriptive purposes and cannot be understood as indicating or implying the relative importance or implicitly indicating the quantity of the technical features indicated. Therefore, features defined as “first” and “second” May explicitly or implicitly include at least one of these features. The words “and/or” and “and/or” appearing throughout the text have the same meaning, and both mean that it includes three parallel solutions, taking “A and/or B” as an example, it includes solution A, or solution B, or a solution that satisfies both A and B at the same time. In addition, the technical solutions of various embodiments can be combined with each other, but it is based on that those of ordinary skill in the art can realize. When the combination of technical solutions is contradictory or cannot be realized, it should be considered that such combination of technical solutions does not exist and is not within the protection scope claimed by the present application.

The present application proposes an acoustic drainage structure. The acoustic drainage structure is applied to electronic devices, and the electronic devices include but are not limited to smart watches and smart bracelets.

Figure 2:
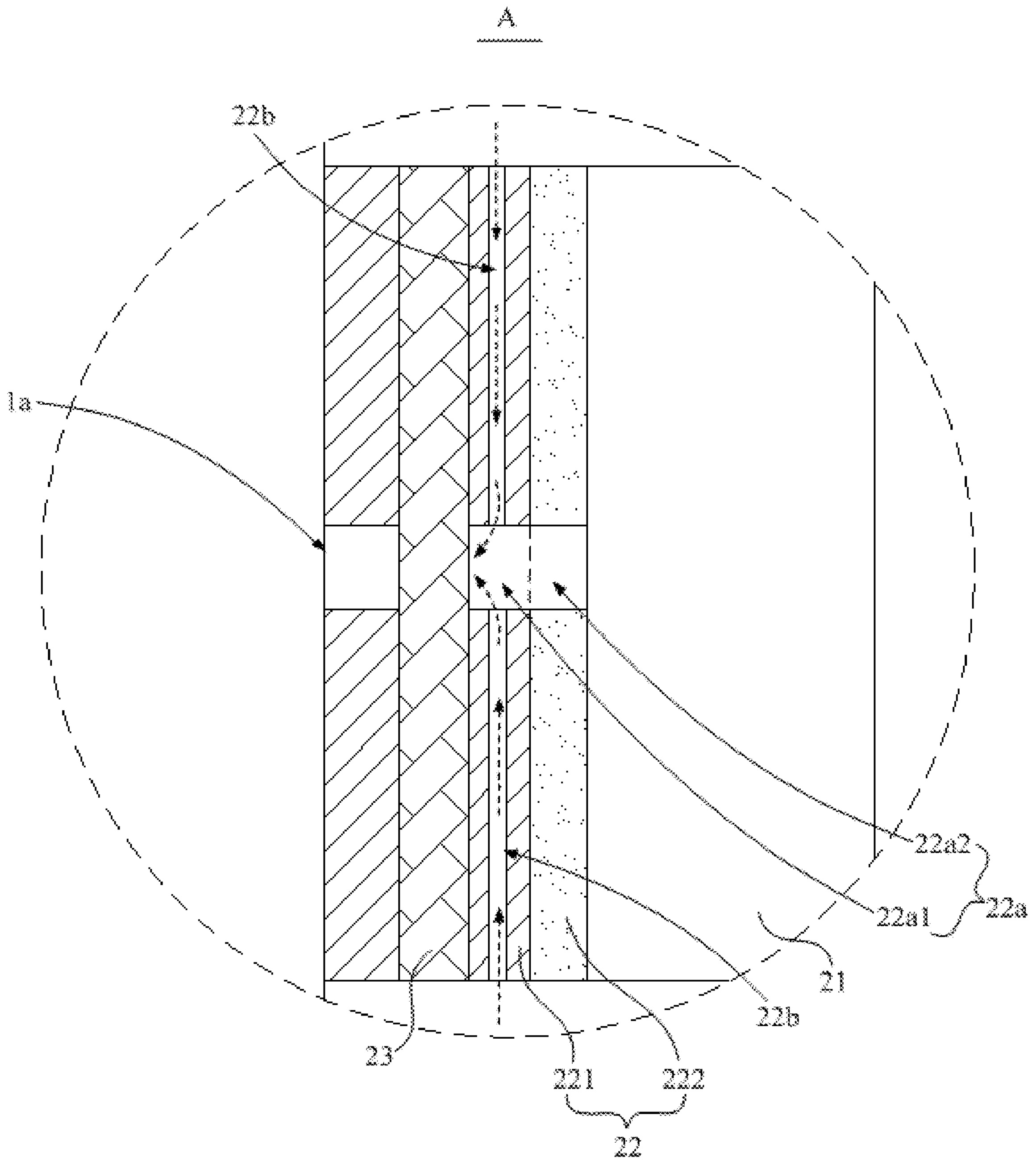
FIG. 2 is an enlarged structural view of part A in FIG. 1.

In an embodiment according to the present application, as shown in FIG. 1 and FIG. 2, the acoustic drainage structure includes a housing 1 and an acoustic assembly. The housing 1 is provided with an accommodating cavity 1*a* and a first sound-pickup hole 1*b* communicated with the accommodating cavity 1*a*. The acoustic assembly includes a sound-pickup module 2 provided in the accommodating cavity 1*a* and a sound-generating unit 3 provided in the accommodating cavity 1*a*. The sound-pickup module 2 includes a sound-pickup unit 21, a connector 22 and a breathable waterproof membrane 23. The breathable waterproof membrane 23 is provided at a cavity wall of the accommodating cavity 1*a*, and the connector 22 is connected to the breathable waterproof membrane 23 and the sound-pickup unit 21. The connector 22 is provided with a second sound-pickup hole 22*a*, and the breathable waterproof membrane 23 is configured to cover the first sound-pickup hole 1*b* and the second sound-pickup hole 22*a*. The breathable waterproof membrane 23, a hole wall of the second sound-pickup hole 22*a* and the sound-pickup unit 21 are enclosed to form a sound-pickup cavity 2*a*. The connector 22 is provided with an air guiding passage 22*b* communicated with the sound-pickup cavity 2*a* and the accommodating cavity 1*a*, so as to make the sound-generating unit 3 drive the breathable waterproof membrane 23 to vibrate.

In this embodiment, the housing 1 can be the housing of the above-mentioned electronic device. The housing 1 is provided with an accommodating cavity 1*a* that can accommodate the sound-pickup module 2 and the sound-generating unit 3. The sound-pickup module 2 and the sound-generating unit 3 can be arranged in opposing arrangements to reduce signal interference between them. The housing 1 can be made of waterproof material, such as metal material, plastic material, etc. The first sound-pickup hole 1*b* is provided at the outer wall of housing 1 and is communicated with the accommodating cavity 1*a*. The first sound-pickup hole 1*b* is configured for allowing external sounds to enter the accommodating cavity 1*a*, so that the sound-pickup module 2 in the accommodating cavity 1*a* can collect the sound from the external environment. The sound-generating unit 3 may be a speaker or the like.

The sound-pickup unit 21 in the sound-pickup module 2 is configured to collect sound signals. The breathable waterproof membrane 23 in the sound-pickup module 2 is configured to realize the waterproof protection of the sound-pickup unit 21. The breathable waterproof membrane 23 can be connected to the cavity wall of the accommodating cavity 1*a* by adhesion or other means. The connector 22 in the sound-pickup module 2 is configured to realize the connection between the sound-pickup unit 21 and the breathable waterproof membrane 23, so that the sound-pickup unit 21 is installed and fixed at the cavity wall of the accommodating cavity 1*a* along with the breathable waterproof membrane 23. After the breathable waterproof membrane 23, connector 22 and sound-pickup unit 21 are installed and fixed, the first sound-pickup hole 1*b* and the sound-pickup cavity 2*a* are separated by a breathable waterproof membrane 23. When the external sound reaches the breathable waterproof membrane 23 via the first sound-pickup hole 1*b*, it causes the breathable waterproof membrane 23 to vibrate. When the breathable waterproof membrane 23 vibrates, it causes the air in the sound-pickup cavity 2*a* to vibrate. The vibration is captured by the sound-pickup unit 21, thereby realizing the collection of sound by the sound-pickup unit 21. The sound-pickup cavity 2*a* can be provided in the axial direction of the first sound-pickup hole 1*b*, so as to alleviate the problem that when the first sound-pickup hole 1*b* and the sound-pickup cavity 2*a* are provided to be staggered, the conduction loss is large during the process that the sound is conducted from the first sound-pickup hole 1*b* to the sound-pickup cavity 2*a*, and the sound collected by the sound-pickup unit 21 has low loudness and high distortion. The sound-pickup unit 21 can be a microphone, a sound sensor, etc.

The connector 22 can connect the sound-pickup unit 21 and the breathable waterproof membrane 23 by adhesion or other methods. The connector 22 is located between the breathable waterproof membrane 23 and the sound-pickup unit 21, and is provided with an air guiding passage 22*b* communicated with the sound-pickup cavity 2*a* and the accommodating cavity 1*a*. As shown by the sound wave conduction direction as indicated by the dotted arrow in FIG. 1, the sound-generating unit 3 will release sound wave into the accommodating cavity 1*a* when working, and when the sound wave is conducted in the accommodating cavity 1*a*, it drives the air in the accommodating cavity 1*a* to vibrate. As shown by the sound wave conduction direction indicated by the dotted arrow in FIG. 2, the air vibration in the accommodating cavity 1*a* will cause the air vibration in the air guiding passage 22*b* and the sound-pickup cavity 2*a*, the vibration is further conducted and applied to the breathable waterproof membrane 23, causing the breathable waterproof membrane 23 to vibrate, so that the breathable waterproof membrane 23 can shake off the moisture attached to the surface of the breathable waterproof membrane 23, the shaken moisture can also be discharged outward via the first sound-pickup hole 1*b*, which can effectively solve the problem of water accumulation on the breathable waterproof membrane 23, realize the drainage of the sound-pickup module 2 and improve the sound-pickup quality of the sound-pickup unit 21, so that electronic devices using this acoustic drainage structure can be used in rainfall, swimming, showering and other scenarios. The above-mentioned connector 22 can be made of resin, viscose, soft glue and other materials. The connector 22 can also be a multi-layer composite structure made of a variety of materials. The air guiding passage 22*b* can be processed and formed on the connector 22 by molding, knife cutting, laser cutting, etc.

In an embodiment, as shown in FIG. 2, the connector 22 includes an adhesive layer 221 and a supporting layer 222. The adhesive layer 221 is configured to adhere the supporting layer 222 and the breathable waterproof membrane 23, the sound-pickup unit 21 is provided at a side of the supporting layer 222 away from the adhesive layer 221, the adhesive layer 221 is provided with a first through hole 22*a*1, the supporting layer 222 is provided with a second through hole 22*a*2, and the first through hole 22*a*1 is communicated with the second through hole 22*a*2 to form the second sound-pickup hole 22*a*. The air guiding passage 22*b* is provided at the adhesive layer 221 and/or the supporting layer 222.

In this embodiment, the adhesive layer 221 is connected to the side of the breathable waterproof membrane 23 away from the first sound-pickup hole 1*b* and the side of the supporting layer 222 away from the sound-pickup unit 21, so that the supporting layer 222 is connected and fixed with the breathable waterproof membrane 23 by the adhesive layer 221. The side of the supporting layer 222 away from the adhesive layer 221 can be connected to the sound-pickup unit 21 by adhesion, screwing, etc., so that the sound-pickup unit 21 is installed and fixed on the supporting layer 222. When the adhesive layer 221 is connected to the supporting layer 222, the first through hole 22*a*1 on the adhesive layer 221 and the second through hole 22*a*2 on the supporting layer 222 are communicated with each other to form a second sound-pickup hole 22*a*, the air guiding passage 22*b* can be provided at the adhesive layer 221 or the supporting layer 222, or the air guiding passage 22*b* is provided on both the adhesive layer 221 and the supporting layer 222, so that the sound-generating unit 3 can output sound into the accommodating cavity 1*a* to drive the air in the air guiding passage 22*b* and the sound-pickup cavity 2*a* to drive the breathable waterproof membrane 23 to vibrate, thus realizing the drainage of sound-pickup module 2. The adhesive layer 221 can be a waterproof adhesive layer or a double-sided adhesive layer, and the supporting layer 222 can be a plastic or resin layer, which is not limited here.

In an embodiment, as shown in FIG. 1, the housing 1 is further provided with a sound-generating hole 1*c* communicated with the accommodating cavity 1*a*, and the sound-generating unit 3 is provided corresponding to the sound-generating hole 1*c*; a sound leaking hole 3*a* is provided at one end of the sound-generating unit 3 away from the sound-generating hole 1*c*, and the sound leaking hole 3*a* is communicated with the accommodating cavity 1*a*.

In this embodiment, the sound-generating unit 3 may be a speaker, and the sound leaking hole 3*a* is configured to discharge the air pushed when the diaphragm inside the speaker vibrates and configured for the speaker to output sound into the accommodating cavity 1*a*. When the sound-generating unit 3 is located at the sound-generating hole 1*c*, the accommodating cavity 1*a* becomes the rear sound cavity of the sound-generating unit 3. When the sound-generating unit 3 works, the sound-generating unit 3 will output sound into the accommodating cavity 1*a* via the sound leaking hole 3*a* and drive the air in the accommodating cavity 1*a* to vibrate, thereby driving the air in the air guiding passage 22*b* and the sound-pickup cavity 2*a* to vibrate, and then driving the breathable waterproof membrane 23 to vibrate, thus realizing the drainage of the sound-pickup module 2.

In practical applications, the above-mentioned connector 22 has various structural forms. In order to better explain the present application, possible structural forms of the connector 22 are described below with reference to the first embodiment to the eighth embodiment. It is worth pointing out that in order to facilitate an intuitive understanding of the structural form of the air guiding passage 22*b*, the accompanying drawings cited in the first embodiment to the eighth embodiment all show in the form of the air guiding passage 22*b* penetrating through the front surface of the connector 22 and the rear surface of the connector 22, but the actual air guiding passage 22*b* can be completely provided inside the connector 22 and become a peripherally closed pipeline structure, or the air guiding passage 22*b* can also be designed as a strip-shaped trough structure, etc. Therefore, as long as it is a hole, groove, channel, cavity, pipe, flow channel or other virtual structures provided on the connector 22 and configured to communicate with the accommodating cavity 1*a* and the sound-pickup cavity 2*a*, it should be considered to be substantially the same as the air guiding passage 22*b* in the present application, and all should fall within the protection scope of the present application.

First Embodiment

Figure 3:
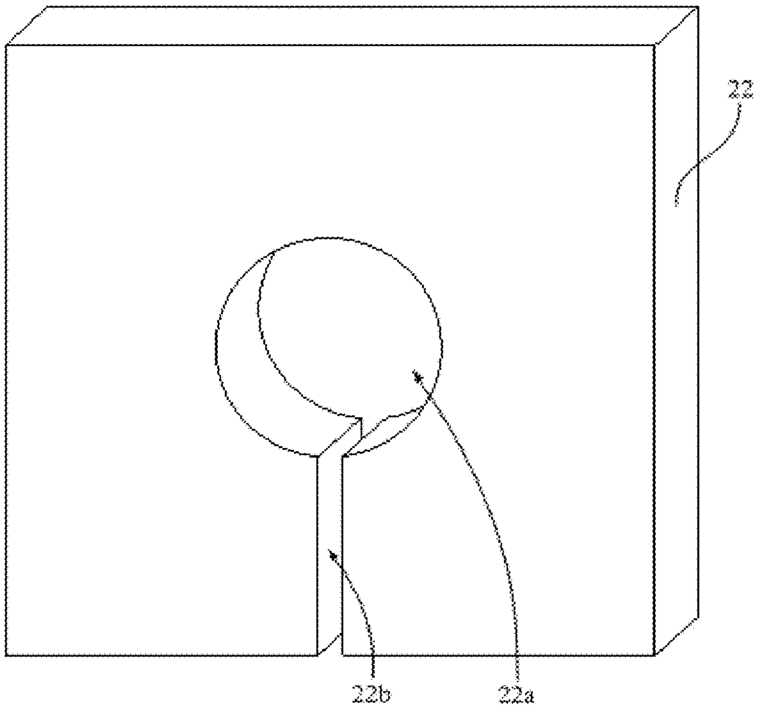
FIG. 3 is a structural schematic view of a connector according to a first embodiment of the present application.

Referring to FIG. 3, and as shown in FIG. 1 and FIG. 2, the air guiding passage 22*b* is configured to penetrate an outer wall of the connector 22 and the hole wall of the second sound-pickup hole 22*a*.

In this embodiment, one air guiding passage 22*b* is provided, and the air guiding passage 22*b* is a single-passage structure that is communicated with the sound-pickup cavity 2*a* and the accommodating cavity 1*a*. The shape of the air guiding passage 22*b* includes but is not limited to straight line, arc shape or wavy shape. At this time, the air vibration in the accommodating cavity 1*a* will cause the air vibration in the sound-pickup cavity 2*a* via the single air guiding passage 22*b*, thereby driving the breathable waterproof membrane 23 to vibrate to achieve drainage of the breathable waterproof membrane 23. Since only one breathable passage is provided on the connector 22, the processing procedure of the connector 22 can be reduced as much as possible while realizing the drainage function of the sound-pickup module 2, thus saving the processing cost of the connector 22, and it is also conducive to maintaining the structural strength of the connector 22, so that the connector 22 has a larger connection surface with the breathable waterproof membrane 23 and the sound-pickup unit 21, thereby maintaining the stability of the connector 22 when connecting the breathable waterproof membrane 23 and the sound-pickup unit 21.

Second Embodiment

Figure 4:
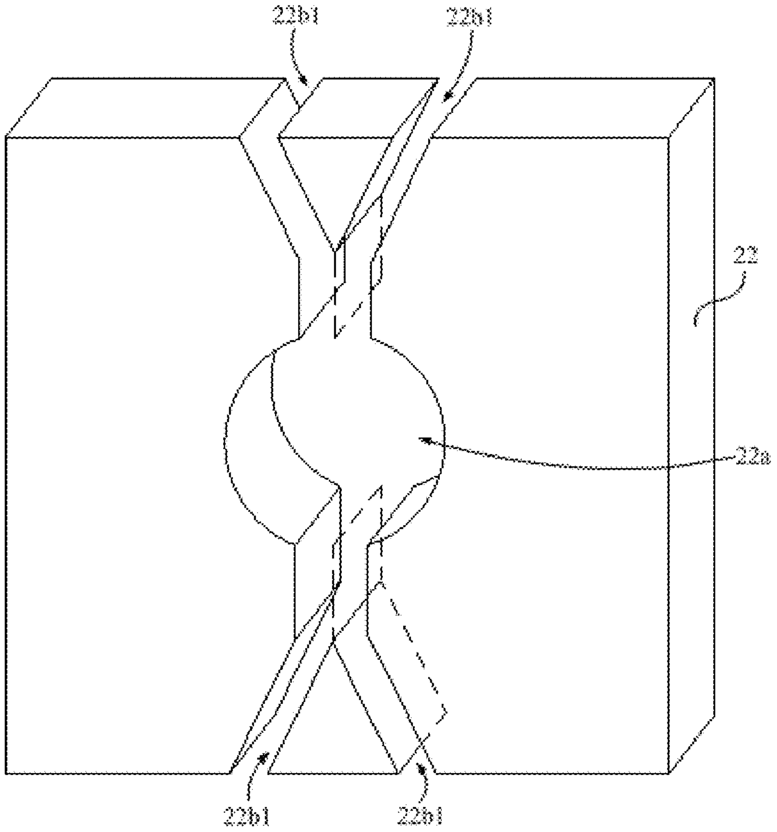
FIG. 4 is a structural schematic view of the connector according to a second embodiment of the present application.

Referring to FIG. 4, combined with FIG. 1 and FIG. 2, the air guiding passage 22*b* includes at least two air guiding branches 22*b*1 provided at the connector 22; at least two air guiding branches 22*b*1 are communicated with each other, and at least one air guiding branch 22*b*1 is communicated with the sound-pickup cavity 2*a* and the accommodation cavity 1*a*.

In this embodiment, the air guiding passage 22*b* may include two or more air guiding branches 22*b*1, two air guiding branches 22*b*1 or multiple air guiding branches 22*b*1 are directly communicated. For example, as shown in FIG. 4, the air guiding passage 22*b* includes four air guiding branches 22*b*1, the four air guiding branches 22*b*1 are provided in pairs at the upper side of the second sound-pickup hole 22*a* and the lower side of the second sound-pickup hole 22*a*. The two air guiding branches 22*b*1 provided at the same side of the second sound-pickup hole 22*a* are communicated with each other. The air guiding branches 22*b*1 provided at different sides of the second sound-pickup hole 22*a* are not directly communicated with each other, but are communicated with each other via the second sound-pickup hole 22*a*. At least one of the two air guiding branches 22*b*1 located at the same side of the second sound-pickup hole 22*a* communicate with the second sound-pickup hole 22*a*. By providing at least two air guiding branches 22*b*1 on the connector 22, the cross-sectional area of each air guiding branch 22*b*1 is smaller than the cross-sectional area of the original air guiding passage 22*b*. In this way, when the air in the accommodating cavity 1*a* vibrates, the air in the air guiding branch 22*b*1 flows and generates greater sound pressure in the air guiding branch 22*b*1 and the second sound-pickup hole 22*a*, thereby driving the breathable waterproof membrane 23 to produce a vibration of larger amplitude, improving the strength of the breathable waterproof membrane 23 in shaking off accumulated water on its surface, and improving the drainage effect of the sound-pickup module 2.

In an embodiment, each air guiding branch 22*b*1 in this embodiment is provided at intervals, and each air guiding branch 22*b*1 is communicated with the sound-pickup cavity

2*a* and the accommodating cavity 1*a*. In this way, each air guiding branch 22*b*1 can be processed separately without interfering with each other. Each air guiding branch 22*b*1 can be processed into different shapes and different sizes according to actual needs to improve the flexibility of design of the air guiding branch 22*b*1.

Third Embodiment

Figure 5:
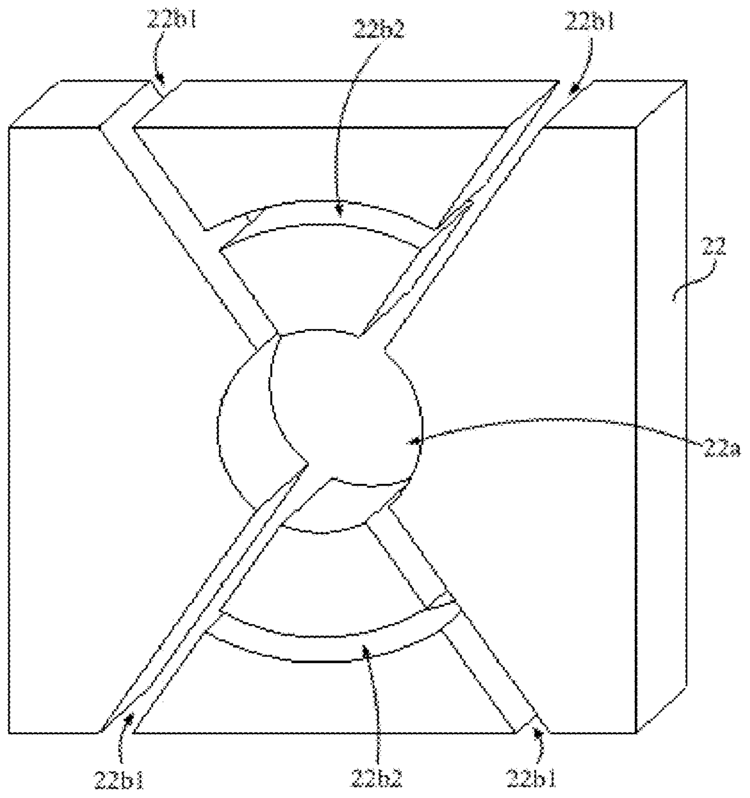
FIG. 5 is a structural schematic view of the connector according to a third embodiment of the present application.

Referring to FIG. 5, and as shown in FIG. 1 and FIG. 2, the air guiding passage 22*b* further includes at least one communication branch 22*b*2, and each communication branch 22*b*2 is communicated with two air guiding branches 22*b*1.

In this embodiment, what is different from the solution in the second embodiment is that some of the air guiding branches 22*b*1 are communicated via the communication branch 22*b*2, instead of being directly communicated.

The air guiding branch 22*b*1 is designed to be communicated via the communication branch 22*b*2, thereby improving the air circulation between each air guiding branch 22*b*1 and the air content in the air guiding passage 22*b*, which is beneficial to exert a stronger driving force on the breathable waterproof membrane 23 by the air in the second sound-pickup hole 22*a* when the air in the air guiding passage 22*b* vibrates, thus driving the breathable waterproof membrane 23 to produce a vibration of larger amplitude, improving the strength of the breathable waterproof membrane 23 in shaking off accumulated water on its surface, and improving the drainage effect of the sound-pickup module 2.

Fourth Embodiment

Figure 6:
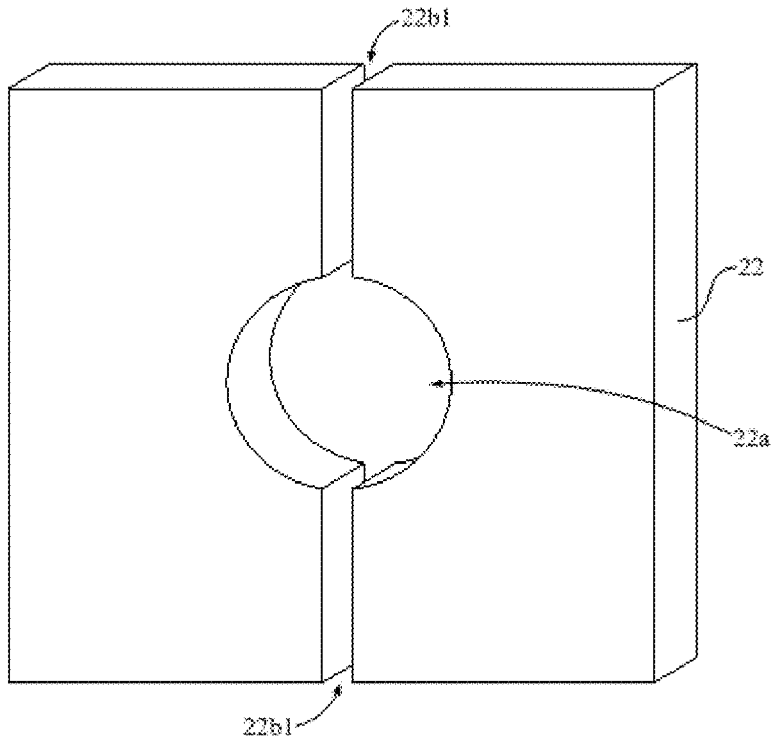
FIG. 6 is a structural schematic view of the connector according to a fourth embodiment of the present application.

Referring to FIG. 6 and combining with FIG. 1 and FIG. 2, the air guiding passage 22*b* includes two air guiding branches 22*b*1 provided at the connector 22; and the two air guiding branches 22*b*1 are symmetrically provided at two opposite sides of the second sound-pickup hole 22*a*, and each air guiding branch 22*b*1 is communicated with the sound-pickup cavity 2*a* and the accommodating cavity 1*a*.

In this embodiment, the air guiding branch 22*b*1 is symmetrically provided at two opposite sides of the second sound-pickup hole 22*a*, the two air guiding branches 22*b*1 cooperate to form a dual-passage structure that is communicated with the sound-pickup cavity 2*a* and the container. Each air guiding branch 22*b*1 adopts a linear extension structure design to reduce the processing difficulty and processing cost of the air guiding branch 22*b*1. When the air in the accommodating cavity 1*a* vibrates, the vibration can first be conducted to the sound-pickup cavity 2*a* and the breathable waterproof membrane 23 via one air guiding branch 22*b*1, then conducted back into the accommodating cavity 1*a* via another air guiding branch 22*b*1; or, the vibration can be conducted to the sound-pickup cavity 2*a* and the breathable waterproof membrane 23 via two air guiding branches 22*b*1, and conducted back into the accommodating cavity 1*a* via two air guiding branches 22*b*1. In this way, avoiding the problem that under the design of single air guiding branch 22*b*1, the vibration intensity of the part of the waterproof breathable membrane close to the air guiding branch 22*b*1 will be greater and the vibration response will be timely, while the vibration intensity of the part of the waterproof breathable membrane away from the air guiding branch 22*b*1 is weaker and the vibration response lags behind, thus enabling the balanced driving of all parts of the waterproof breathable membrane.

Fifth Embodiment

Figure 7:
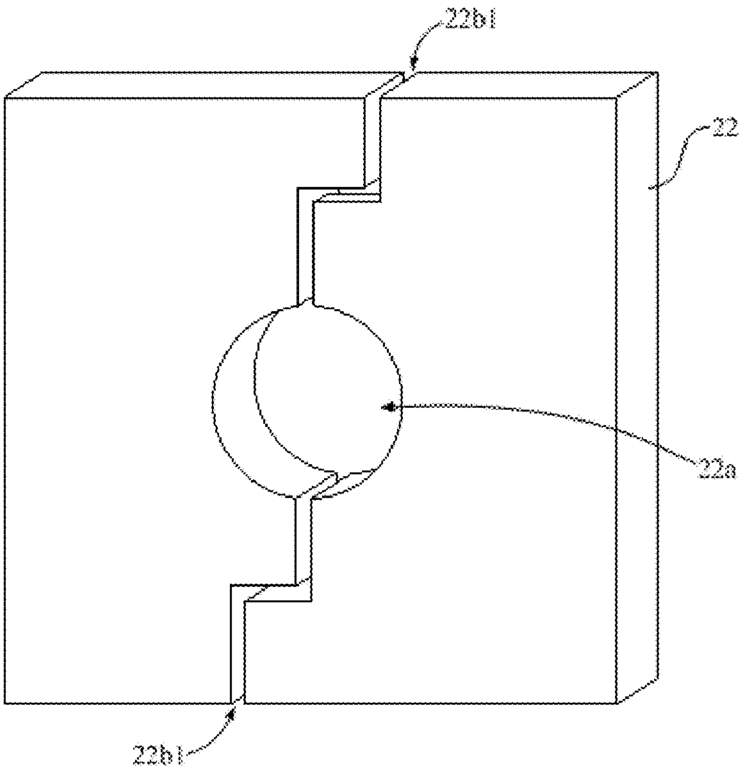
FIG. 7 is a structural schematic view of the connector according to a fifth embodiment of the present application.

Referring to FIG. 7 and combining with FIG. 1 and FIG. 2, the difference between this embodiment and the fourth embodiment is that: in this embodiment, each air guiding branch 22*b*1 is at least partially provided in a bent section, and each air guiding branch 22*b*1 is bent and extended and penetrates the outer wall of the connector 22 and the hole wall of the second sound-pickup hole 22*a*, so that the accommodating cavity 1*a* and the sound-pickup cavity 2*a* are communicated via each air guiding branch 22*b*1. Therefore, the air guiding branch 22*b*1 is designed as a non-linear extension structure, and the sound in some frequency bands of the sound emitted by the sound-generating unit 3 can be attenuated by the air guiding branch 22*b*1, thereby avoiding the problem that the sound-pickup unit 21 collects too many non-user sounds, which causes the sound-pickup unit 21 to collect too much noise.

Sixth Embodiment

Figure 8:
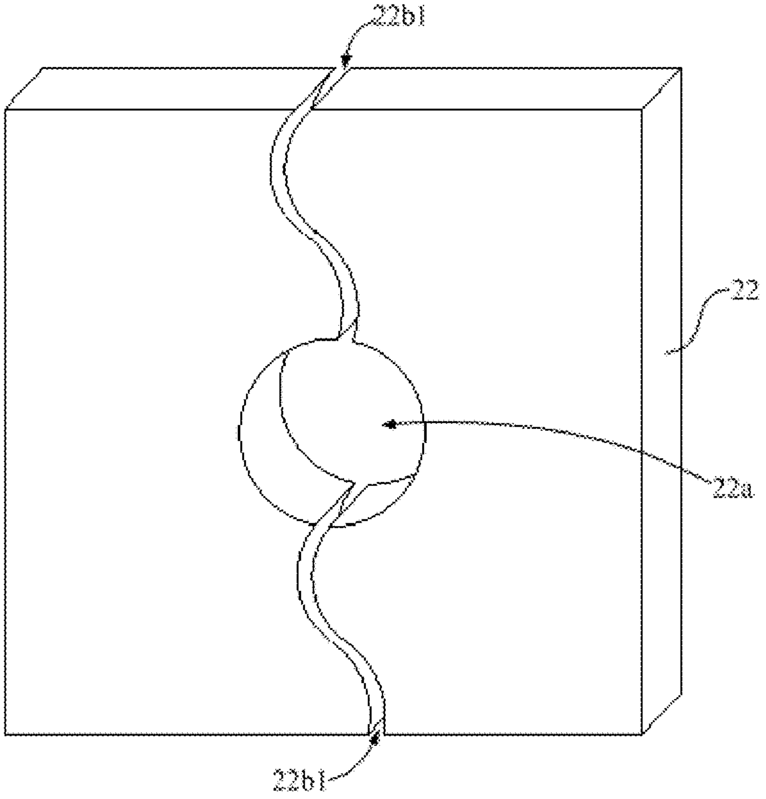
FIG. 8 is a structural schematic view of the connector according to a sixth embodiment of the present application.

Referring to FIG. 8 and combining with FIG. 1 and FIG. 2, the difference between this embodiment and the fourth embodiment is that: in this embodiment, each air guiding branch 22*b*1 is at least partially provided in an arc section; the shape of each air guiding branch 22*b*1 includes but is not limited to arc shape, S-shape or wavy shape, which can increase the extension length of each air guiding branch 22*b*1, so that the sound in some frequency bands of the sound emitted by the sound-generating unit 3 is attenuated by the air guiding branch 22*b*1, thereby avoiding the problem that the sound-pickup unit 21 collects too many non-user sounds, which causes the sound-pickup unit 21 to collect too much noise.

Seventh Embodiment

Figure 9:
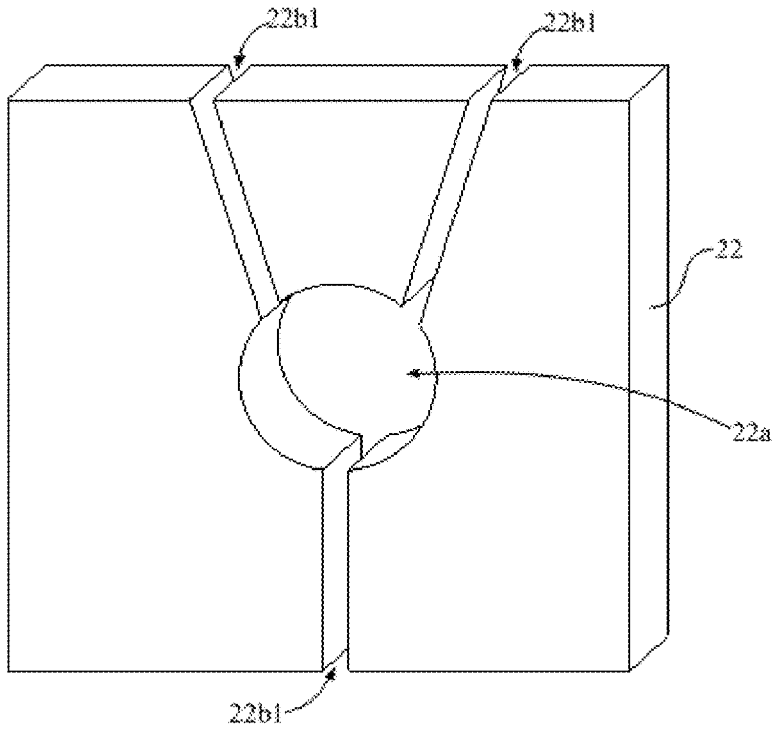
FIG. 9 is a structural schematic view of the connector according to a seventh embodiment of the present application.
Figure 10:
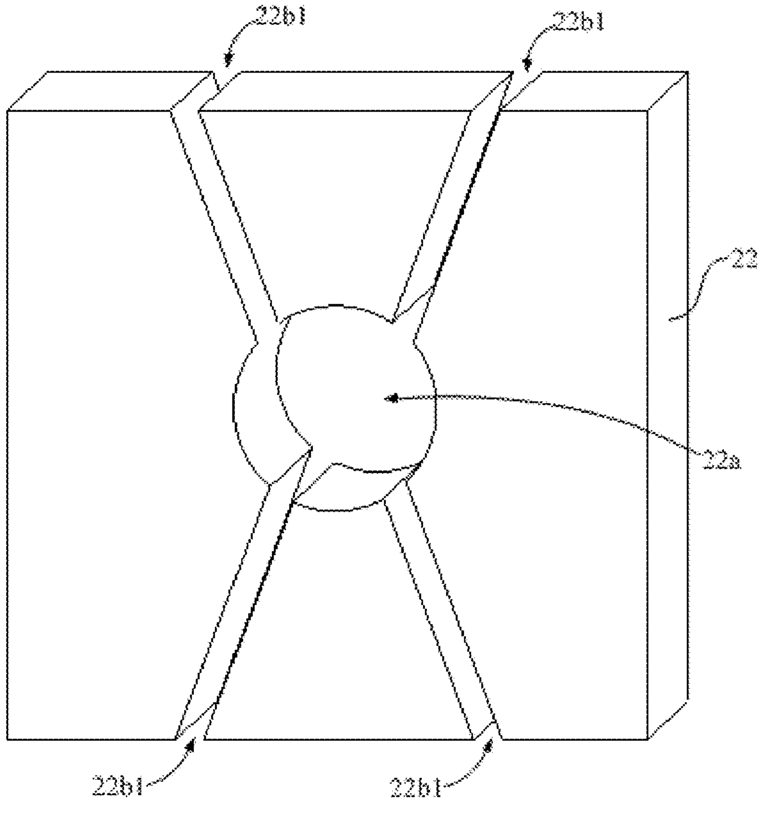
FIG. 10 is a structural schematic view of the connector according to an eighth embodiment of the present application.

Referring to FIG. 9 and combining with FIG. 1 and FIG. 2, the air guiding passage 22*b* includes a plurality of air guiding branches 22*b*1 provided at the connector 22; and the plurality of the air guiding branches 22*b*1 are provided around the second sound-pickup hole 22*a*, and each air guiding branch 22*b*1 is communicated with the sound-pickup cavity 2*a* and the accommodating cavity 1*a*.

In this embodiment, the plurality of air guiding branches 22*b*1 can be evenly distributed around the second sound-pickup hole 22*a*, or distributed on two opposite sides of the second sound-pickup hole 22*a*, so as to facilitate the processing of each air guiding branch 22*b*1. By providing the plurality of the air guiding branches 22*b*1, the air content in the air guiding passage 22*b* can be increased, thus improving the driving strength for the breathable waterproof membrane 23, and enabling to carry out targeted structural design for each air guiding branch 22*b*1, for example, separately designing the shape and size of the air guiding branch 22*b*1. The setting and design of the air guiding branch 22*b*1 are more flexible, so that the connector 22 can be configured to meet the driving requirements of the breathable waterproof membrane 23 under the conditions of different housing 1 structures and different sound-generating unit 3.

The present application further proposes an electronic device. The electronic device includes but is not limited to smart watches and smart bracelets.

Figure 13:
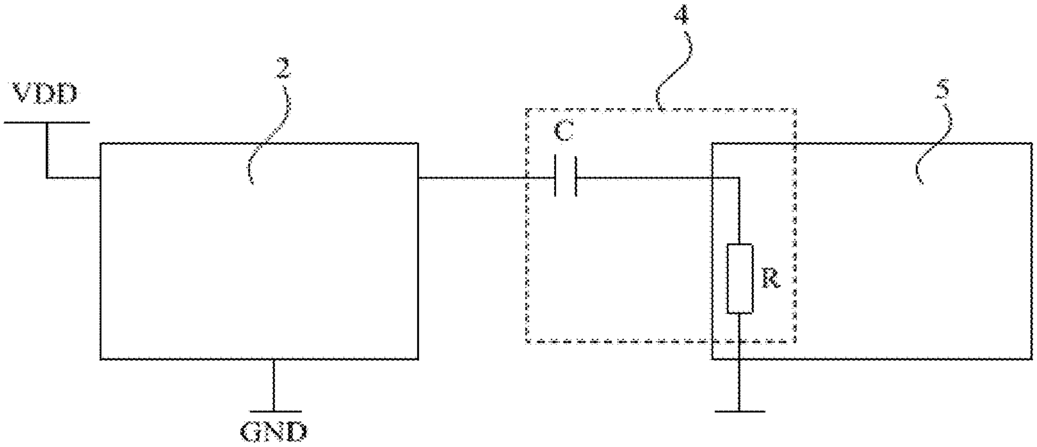
FIG. 13 is a partial circuit structure view of an acoustic drainage structure according to the present application.

In an embodiment according to the present application, referring to FIG. 13 and combining FIG. 1 and FIG. 2, the electronic device includes the above-mentioned acoustic drainage structure, a filter module 4 and a communication module 5. The filter module 4 is electrically connected to the sound-pickup unit 21 of the acoustic drainage structure and is configured to reduce noise collected by the sound-pickup unit 21. The communication module 5 is electrically connected to the filter module 4 and is configured to process audio signals.

In this embodiment, because when the sound-pickup unit 21 collects the user's voice in the external environment, the sound output by the sound-generating unit 3 will also be conducted to the sound-pickup unit 21 via the accommodating cavity 1*a*, the air guiding passage 22*b* and the sound-pickup cavity 2*a*, the sounds that the sound-pickup unit 21 may collect include the user's voice, noise from the external environment and noise output from the speaker. The noise collected by the sound-pickup unit 21 is relative to the user's voice, because the main function of the sound-pickup unit 21 is to collect the user's voice, therefore, the non-user voice collected by the sound-pickup unit 21 becomes noise. In order to suppress or eliminate the above-mentioned noise from the external environment and the noise output from the speaker that collected by the sound-pickup unit 21, a filter module 4 is provided in the electronic device, the filter module 4 can be provided in the accommodating cavity 1*a* of the housing 1, using the filter module 4 to filter the sound signals collected by the pickup unit 21 to reduce the sound signal in the non-user voice band, reduce the signal amount of noise signals transmitted to the communication module 5, reduce the noise included in the user's voice transmission process when performing voice interaction by the communication module 5, and improve the clarity of the user's voice transmission when performing voice interaction by the communication module 5.

The specific structure of the acoustic drainage structure in this embodiment refers to the above-mentioned embodiments. Since the electronic device adopts all the technical solutions of all the above-mentioned embodiments, therefore, it has at least all the beneficial effects brought by the technical solutions of the above embodiments, which will not be described again one by one here.

In order to better explain this embodiment, the structural design and working process of this electronic device are described below.

Figure 11:
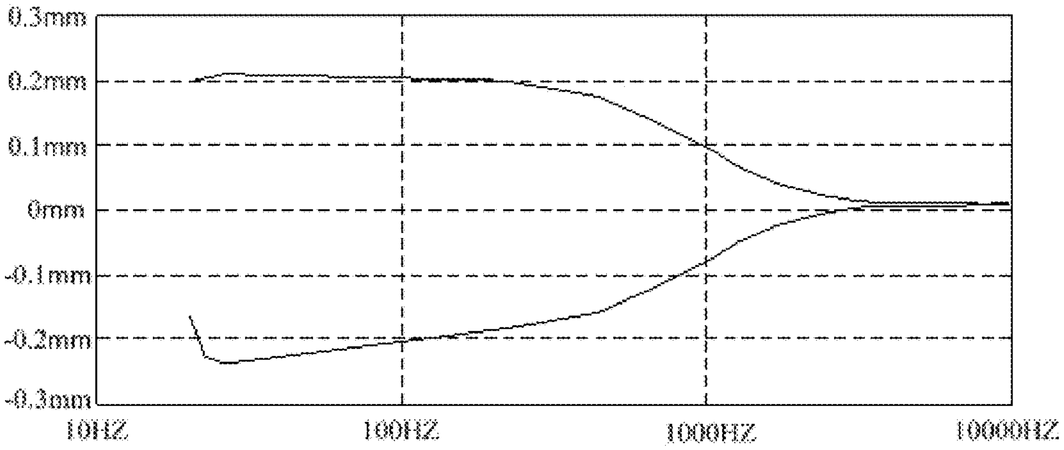
FIG. 11 is a relation view between diaphragm amplitude and sound wave frequency in a sound-generating unit of an acoustic drainage structure according to the present application.

The sound-generating unit 3 in this electronic device can be a speaker. When the speaker is working, the diaphragm in the speaker vibrates front and back and forms front amplitude and rear amplitude. Taking the speaker shown in FIG. 11 as an example, the abscissa in FIG. 11 represents the output frequency of the speaker, and the ordinate represents the front amplitude of the diaphragm and rear amplitude of the diaphragm inside the speaker. It can be seen from FIG. 11 that when the speaker operates at a low frequency of 30 HZ to 100 HZ, the amplitude of its diaphragm reaches the maximum value, and the front amplitude curve and rear amplitude curve are basically at a symmetrical level, that is, the diaphragm vibrates back and forth like a piston, and the speaker pushes the air in the accommodating cavity 1*a* to vibrate in the form of longitudinal waves via the sound leaking hole 3*a*.

Figure 12:
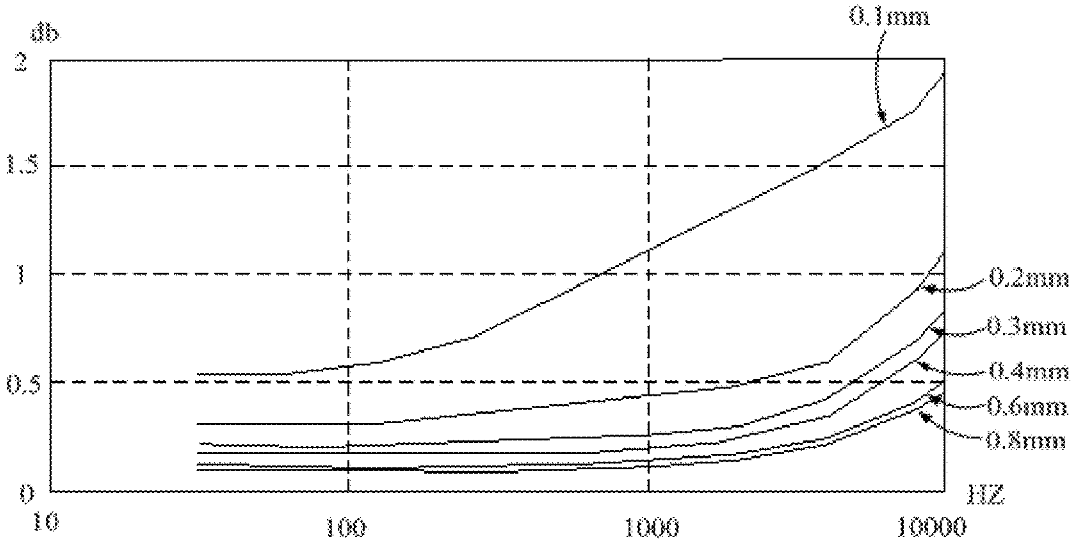
FIG. 12 is a frequency response curve view of an acoustic drainage structure according to the present application.

A long and narrow air guiding passage 22*b* is provided on the connector 22 of the electronic device, so that the air guiding passage 22*b* can pass the sound signal in the frequency band of 30 HZ to 100 HZ output by the speaker, it can make maximum use of the pushing effect of the speaker diaphragm on the air in the sound-pickup cavity 2*a*, thus causing the breathable waterproof membrane 23 to vibrate with a larger amplitude, thereby shaking off the accumulated water on the breathable waterproof membrane 23, making the acoustic drainage structure in the electronic device enter the drainage state, and realizing the ideal drainage effect of the sound-pickup module 2 in the electronic device. In addition, the speaker can further output sounds with frequencies less than 30 HZ or greater than 100 HZ, such as 300 HZ to 6 kHZ, at this time, the acoustic drainage structure will no longer be in the drainage state, but will enter the normal sound-generating state, the speaker can be configured to play audio signals such as user voice or music. Taking the air guiding passage 22*b* designed as a passage structure with a rectangular cross-sectional shape as an example, two of the three parameters of the length, width and height of the air guiding passage 22*b* can be controlled by the control variable method, and the remaining parameter is used as a variable, by testing the loudness of sounds in different frequency bands when the sounds in different frequency bands pass through the air guiding passage 22*b*, the optimal size of the air guiding passage 22*b* for sound signals in the frequency band of 30 HZ to 100 HZ can be obtained. For example, setting the extension length of the air guiding passage 22*b* to 4 mm, setting the width of the air guiding passage 22*b* to 0.15 mm, and using the height (that is, depth) of the air guiding passage 22*b* as the variable, when the height of the air guiding passage 22*b* is respectively set to 0.1 mm, 0.2 mm, 0.3 mm, 0.4 mm, 0.6 mm and 0.8 mm, the loudness curves of sounds with different frequencies passing through the air guiding passage 22*b* as shown in FIG. 12 are obtained. It can be seen from FIG. 12 that when the height of the air guiding passage 22*b* is in the range of 0.3 mm to 0.8 mm, the loudness of the sound in the frequency band of 30 HZ to 100 HZ is greater than 0, that is, the sound signal in the frequency band of 30 HZ to 100 HZ can be conducted to the sound-pickup cavity 2*a* and the breathable waterproof membrane 23 via the air guiding passage 22*b*. Moreover, when the height of the air guiding passage 22*b* is in the range of 0.3 mm to 0.8 mm, the loudness of the sound in the frequency band of 30 HZ to 100 HZ gradually decreases, that is, when the height of the air guiding passage 22*b* is in the range of 0.3 mm to 0.8 mm, the sound in the frequency band of 30 HZ to 100 HZ can not only be conducted to the sound-pickup cavity 2*a* and the breathable waterproof membrane 23 via the air guiding passage 22*b*, but the loudness of the sound in the frequency band of 30 HZ to 100 HZ will not be enhanced but slightly reduced, in this way, it will help prevent the sound in the frequency band of 30 HZ to 100 HZ from being collected too much by the sound-pickup unit 21, and interfering with the sound-pickup unit 21 collecting the user's voice. Therefore, the structural design of the air guiding passage 22*b* with a height within the range of 0.3 mm to 0.8 mm, an extension length of 4 mm and a width of 0.15 mm is ideal. According to this structural design method, different air guiding passage 22*b* structures can be designed according to different speakers.

In order to ensure the sound-pickup quality of the sound-pickup unit 21, it should be reduced as much as possible that the sound of 30 HZ to 100 HZ is picked up by the sound-pickup unit 21 and amplified into the communication module 5, thereby affecting the call quality of communication module 5. Therefore, as shown in FIG. 13, a capacitor C can be connected in series on the connection circuit between the sound-pickup unit 21 and the communication unit, so that the capacitor C is connected in series with the inherent resistance R of the communication module 5 to form the filter module 4. The resistance value of the resistor R is fixed. According to the filter cutoff frequency formula $f=1/(2*R*C)=100$ Hz, as long as appropriate capacitor C of the capacitance size is selected, the cutoff frequency f of the filter module 4 can be 100 Hz, so the sound below the 100 HZ frequency band collected by the sound-pickup unit 21 can be eliminated by the filter module 4, that is, the sound from 30 HZ to 100 HZ output from the speaker to the sound-pickup unit 21 is reduced, and the sound-pickup quality of the sound-pickup unit 21 is improved. In addition, a digital filter can be further added to the communication module 5, the digital filter is configured to perform secondary reduction to the sound below the 100 HZ frequency band, thus further improving the sound-pickup quality of the sound-pickup unit 21. Since the speech frequency band of human speech ranges from 300 HZ to 6 kHZ, the filter module 4 will not interfere with the user's voice and will not affect the call quality of this electronic device.

The above embodiments are only some embodiments of the present application, and are not intended to limit the scope of the present application. Under the inventive concept of the present application, any equivalent structure transformation made by using the description and accompanying drawings of the present application, or directly or indirectly applied in other related technical fields, is included within the scope of the present application.

What is claimed is:

1. An acoustic drainage structure, comprising:

a housing provided with an accommodating cavity and a first sound-pickup hole communicated with the accommodating cavity; and an acoustic assembly comprising a sound-pickup module provided in the accommodating cavity and a sound-generating unit provided in the accommodating cavity, wherein the sound-pickup module comprises a sound-pickup unit, a connector and a breathable waterproof membrane, and the breathable waterproof membrane is provided at a cavity wall of the accommodating cavity; the connector is connected to the breathable waterproof membrane and the sound-pickup unit, and the connector is provided with a second sound-pickup hole; the breathable waterproof membrane is configured to cover the first sound-pickup hole and the second sound-pickup hole, and the breathable waterproof membrane, a hole wall of the second sound-pickup hole and the sound-pickup unit are enclosed to form a sound-pickup cavity; and the connector is provided with an air guiding passage communicated with the sound-pickup cavity and the accommodating cavity, so as to make the sound-generating unit drive the breathable waterproof membrane to vibrate;

wherein the housing is further provided with a sound-generating hole communicated with the accommodating cavity, and the sound-generating unit is provided corresponding to the sound-generating hole;

a sound leaking hole is provided at one end of the sound-generating unit away from the sound-generating hole, and the sound leaking hole is communicated with the accommodating cavity;

wherein the connector comprises an adhesive layer and a supporting layer;

the adhesive layer is configured to adhere the supporting layer and the breathable waterproof membrane, and the sound-pickup unit is provided at a side of the supporting layer away from the adhesive layer; the adhesive layer is provided with a first through hole, and the supporting layer is provided with a second through hole; the first through hole is communicated with the second through hole to form the second sound-pickup hole;

the air guiding passage is provided at the adhesive layer and the supporting layer;

the acoustic drainage structure has a drainage state when the breathable waterproof membrane vibrates; and in the drainage state, a sound generating frequency of the sound-generating unit is greater than or equal to 30 HZ and less than or equal to 100 HZ.

2. The acoustic drainage structure according to claim 1, wherein the air guiding passage is configured to penetrate an outer wall of the connector and the hole wall of the second sound-pickup hole.

3. The acoustic drainage structure according to claim 1, wherein the air guiding passage comprises at least two air guiding branches provided at the connector, and at least two of the air guiding branches are communicated with the sound-pickup cavity and the accommodating cavity.

4. The acoustic drainage structure according to claim 3, wherein each air guiding branch is provided at intervals, and each air guiding branch is communicated with the sound-pickup cavity and the accommodating cavity.

5. The acoustic drainage structure according to claim 3, wherein at least two air guiding branches are communicated with each other; and/or the air guiding passage further comprises at least one communication branch, and each communication branch is communicated with two air guiding branches.

6. The acoustic drainage structure according to claim 1, wherein the air guiding passage comprises two air guiding branches provided at the connector; and the two air guiding branches are symmetrically provided at two opposite sides of the second sound-pickup hole, and each air guiding branch is communicated with the sound-pickup cavity and the accommodating cavity.

7. The acoustic drainage structure according to claim 1, wherein the air guiding passage comprises a plurality of air guiding branches provided at the connector; and the plurality of the air guiding branches are provided around the second sound-pickup hole, and each air guiding branch is communicated with the sound-pickup cavity and the accommodating cavity.

8. An electronic device, comprising the acoustic drainage structure according to claim 1.

9. The electronic device according to claim 8, further comprising:

a filter module electrically connected to the sound-pickup unit of the acoustic drainage structure and configured to reduce noise collected by the sound-pickup unit; and a communication module electrically connected to the filter module and configured to process audio signals.

* * * * *